US011081262B2

(12) United States Patent
Ogawa et al.

(10) Patent No.: US 11,081,262 B2
(45) Date of Patent: Aug. 3, 2021

(54) GROMMET

(71) Applicant: YAZAKI CORPORATION, Tokyo (JP)

(72) Inventors: Masayoshi Ogawa, Aichi (JP); Satoshi Yokoyama, Aichi (JP); Shinichi Ikeda, Aichi (JP); Akitoshi Kimura, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 156 days.

(21) Appl. No.: 16/525,276

(22) Filed: Jul. 29, 2019

(65) Prior Publication Data
US 2020/0075199 A1 Mar. 5, 2020

(30) Foreign Application Priority Data

Aug. 30, 2018 (JP) .............................. JP2018-161960

(51) Int. Cl.
*H02G 3/22* (2006.01)
*B60R 16/02* (2006.01)
*H01B 17/58* (2006.01)
*F16L 5/02* (2006.01)

(52) U.S. Cl.
CPC ............ *H01B 17/583* (2013.01); *H02G 3/22* (2013.01); *B60R 16/0222* (2013.01); *F16L 5/02* (2013.01)

(58) Field of Classification Search
CPC .... H01B 17/583; H01B 17/586; H01B 17/00; H02G 3/22; H02G 3/0468; H02G 3/04; H02G 3/36; H02G 3/0406; B60R 16/0222; F16L 5/02

USPC .... 174/152 G, 153 G, 152 R, 135, 650, 142, 174/137 R, 151, 17 CT; 16/2.1, 2.2; 248/56; 439/271, 272
See application file for complete search history.

(56) References Cited

U.S. PATENT DOCUMENTS

| | | | |
|---|---|---|---|
| 6,240,597 B1* | 6/2001 | Mochizuki | B60R 16/0222 16/2.1 |
| 7,026,549 B1* | 4/2006 | Smutny | F16L 5/027 16/2.1 |
| 7,098,401 B1* | 8/2006 | Herald | B60R 16/0222 16/2.1 |

(Continued)

FOREIGN PATENT DOCUMENTS

| | | |
|---|---|---|
| JP | 5-62131 U | 8/1993 |
| JP | 2014-33564 A | 2/2014 |
| JP | 2014-138519 A | 7/2014 |

*Primary Examiner* — Angel R Estrada
(74) *Attorney, Agent, or Firm* — Kenealy Vaidya LLP (57) ABSTRACT

A grommet which is configured to cover a periphery of a wire harness includes a panel mounting portion which is configured to be mounted to a panel. The panel mounting portion includes a base portion which is formed in an annular shape, a seal portion which is formed on the base portion and is configured to be in close contact with a surface of the panel, and a groove portion which is formed between the base portion and the seal portion along a peripheral direction of the panel mounting portion. A plurality of reinforcing ribs are configured to connect the base portion and the seal portion and are arranged in the peripheral direction in the groove portion, and the reinforcing ribs are inclined with respect to a mounting direction of the panel mounting portion to the panel.

3 Claims, 10 Drawing Sheets

(56) References Cited

U.S. PATENT DOCUMENTS

| | | | |
|---|---|---|---|
| 7,418,765 B2* | 9/2008 | Kameyama | B60R 16/0222 16/2.1 |
| 8,134,076 B2* | 3/2012 | Nagayasu | B60R 16/0222 174/152 G |
| 8,314,337 B2* | 11/2012 | Fujita | H02G 3/22 174/153 G |
| 8,375,513 B2* | 2/2013 | Okuhara | H02G 3/22 16/2.1 |
| 9,083,168 B2* | 7/2015 | Kamenoue | B60R 16/0222 |
| 9,096,185 B2* | 8/2015 | Fujita | B60R 16/0222 |
| 10,696,248 B2* | 6/2020 | Yoshimura | H02G 3/22 |
| 2014/0196931 A1 | 7/2014 | Fujita et al. | |
| 2015/0144378 A1 | 5/2015 | Asayama | |

* cited by examiner

GROMMET

CROSS-REFERENCE TO RELATED APPLICATIONS

This application is based on and claims priority under 35 USC 119 from Japanese Patent Application No. 2018-161960 filed on Aug. 30, 2018, the contents of which are incorporated herein by reference.

TECHNICAL FIELD

The present disclosure relates to a grommet.

BACKGROUND ART

For example, a wire harness routed between a vehicle body and a back door of a vehicle passes through a flexible grommet, and thus a waterproof property of the wire harness is ensured while being protected. The grommet is mounted on a panel of the vehicle and includes a seal portion which is in close contact with a surface of the panel (see, for example, JP 2014-033564 A).

In order to improve the sealing property of the seal portion, it is necessary to increase a surface pressure of the seal portion which is in close contact with the panel. Therefore, it is considered to form a plurality of reinforcing ribs between a base portion and the seal portion of a panel mounting portion, in which the seal portion is formed, along a mounting direction to the panel at intervals in a peripheral direction so as to perform reinforcing.

However, when the seal portion is reinforced by the reinforcing ribs, the seal portion is locally reinforced at a plurality of locations in the peripheral direction and is not elastically deformed easily. Therefore, a large force is required for mounting to the panel, and the mounting operability is reduced. The seal portion is in close contact with the panel locally for a long time with a large surface pressure, and thus compression set may occur and the sealing property may be decreased.

SUMMARY OF INVENTION

In view of the above-described circumstance, the present disclosure is to provide a grommet by which an excellent sealing property can be obtained while securing the good operability in mounting to the panel.

According to the aspects of the present invention, it is possible to provide a grommet by which an excellent sealing property can be obtained while securing the good operability in mounting to the panel.

The aspects of present invention has been briefly described as above. Further, details of the aspects of the present invention will be clarified by reading a mode (hereinafter, referred to as "embodiment") for carrying out the invention to be described below with reference to accompanying drawings.

BRIEF DESCRIPTION OF DRAWINGS

FIGS. 2A and 2B are views illustrating the grommet according to the present embodiment.

FIGS. 6A and 6B are diagrams illustrating reinforcing ribs in a seal portion.

FIGS. 8A and 8B are diagrams illustrating reinforcing ribs in a seal portion according to the reference example.

DESCRIPTION OF EMBODIMENTS

Hereinafter, embodiments according to the invention will be described with reference to the drawings.

Figure 1:
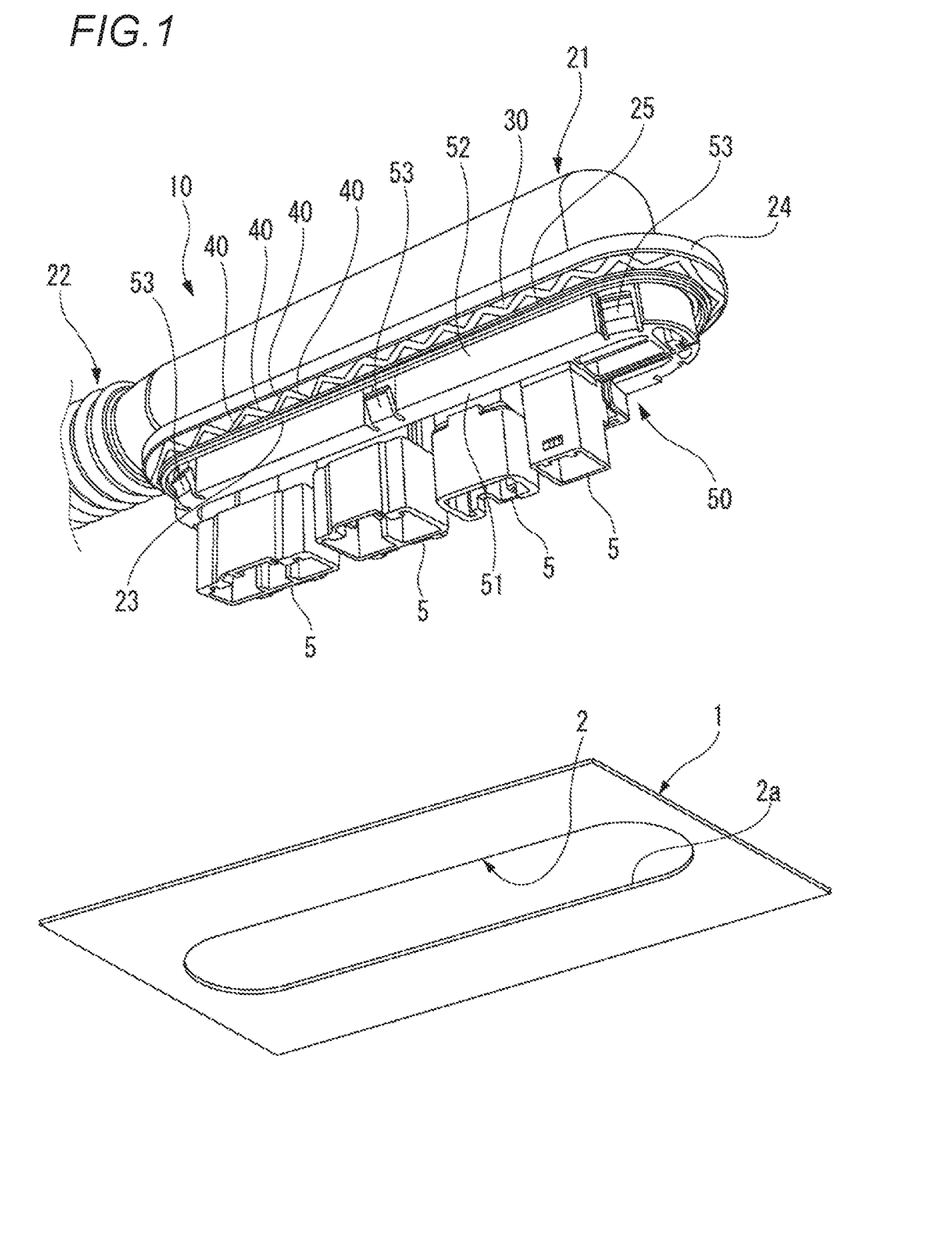
FIG. 1 is a perspective view of a panel mounting portion of a grommet according to the present embodiment.
Figure 2A:
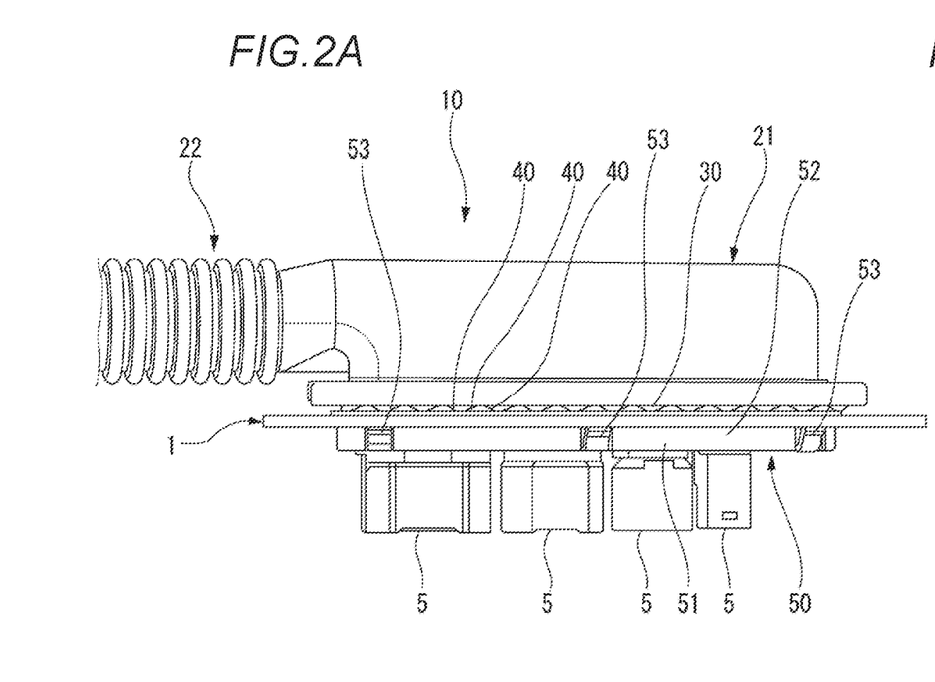
FIG. 2A is a side view of the panel mounting portion.
Figure 2B:
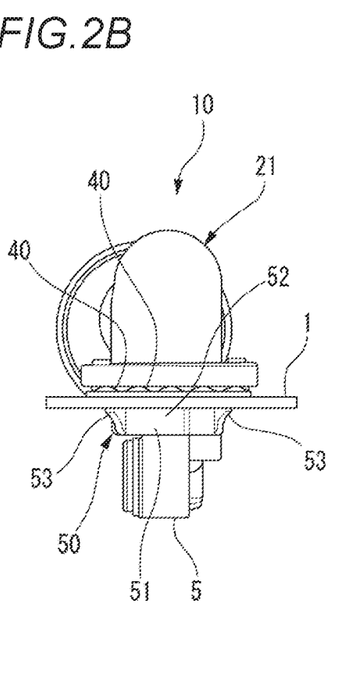
FIG. 2B is a front view of the panel mounting portion.
Figure 3:
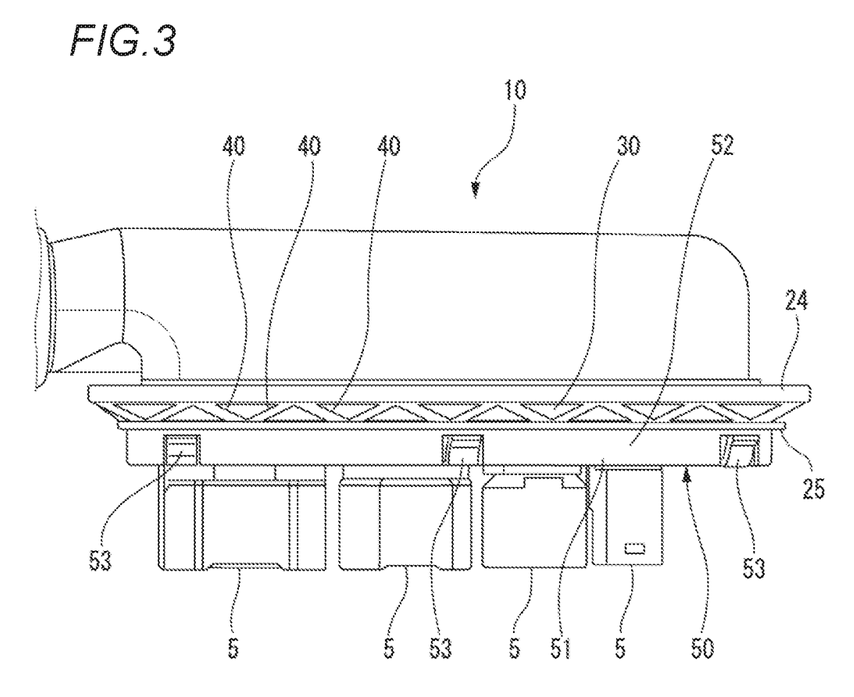
FIG. 3 is a side view of the panel mounting portion before being mounted to the panel.

FIG. 1 is a perspective view of a panel mounting portion of a grommet according to the present embodiment. FIGS. 2A and 2B are views illustrating the grommet according to the present embodiment. FIG. 2A is a side view of the panel mounting portion, and FIG. 2B is a front view of the panel mounting portion. FIG. 3 is a side view of the panel mounting portion before being mounted to the panel.

As illustrated in FIG. 1 to FIG. 3, a grommet 10 according to the present embodiment includes an inner member 50. The grommet 10 is fitted in and assembled to an attachment hole 2 formed in a panel 1. The grommet 10 is, for example, assembled on a wire harness routed between a vehicle body and a back door in a vehicle to protect and waterproof the wire harness.

The grommet 10 is integrally formed of elastic material which is made of a rubber or the like, and includes a panel mounting portion 21 and a wire insertion portion 22. The panel mounting portion 21 is formed in an elongated shape. The panel mounting portion 21 is formed in a recessed shape having an oval-shaped opening portion 23. The wire insertion portion 22 is formed in a tube shape and is consecutively installed to one end side of the panel mounting portion 21. The panel mounting portion 21 includes an annular base portion 24 at the opening portion 23, and a seal portion 25 is formed on the base portion 24 on a mounting side to the panel 1.

The inner member 50 is integrally molded from a synthetic resin which is made of plastic or the like. The inner member 50 is formed in an elongated shape, and is fitted and secured to the panel mounting portion 21 from the opening portion 23. In the inner member 50, a portion protruding from the opening portion 23 of the panel mounting portion 21 is a fitting portion 51 having an outer diameter slightly smaller than an inner diameter of the attachment hole 2 of the panel 1, and the fitting portion 51 is fitted into the attachment hole 2. The inner member 50 includes a plurality of locking claws 53 on a peripheral surface 52 of the fitting portion 51. These locking claws 53 lock an edge portion 2a of the attachment hole 2 when the fitting portion 51 is fitted into the attachment hole 2.

Wires (not illustrated) of a wire harness to which the grommet 10 is assembled are inserted through the wire insertion portion 22. Further, connectors 5 connected to an end of each of the wires of the wire harness are secured to the inner member 50. Mating connectors are fitted and connected to these connectors 5.

Figure 4:
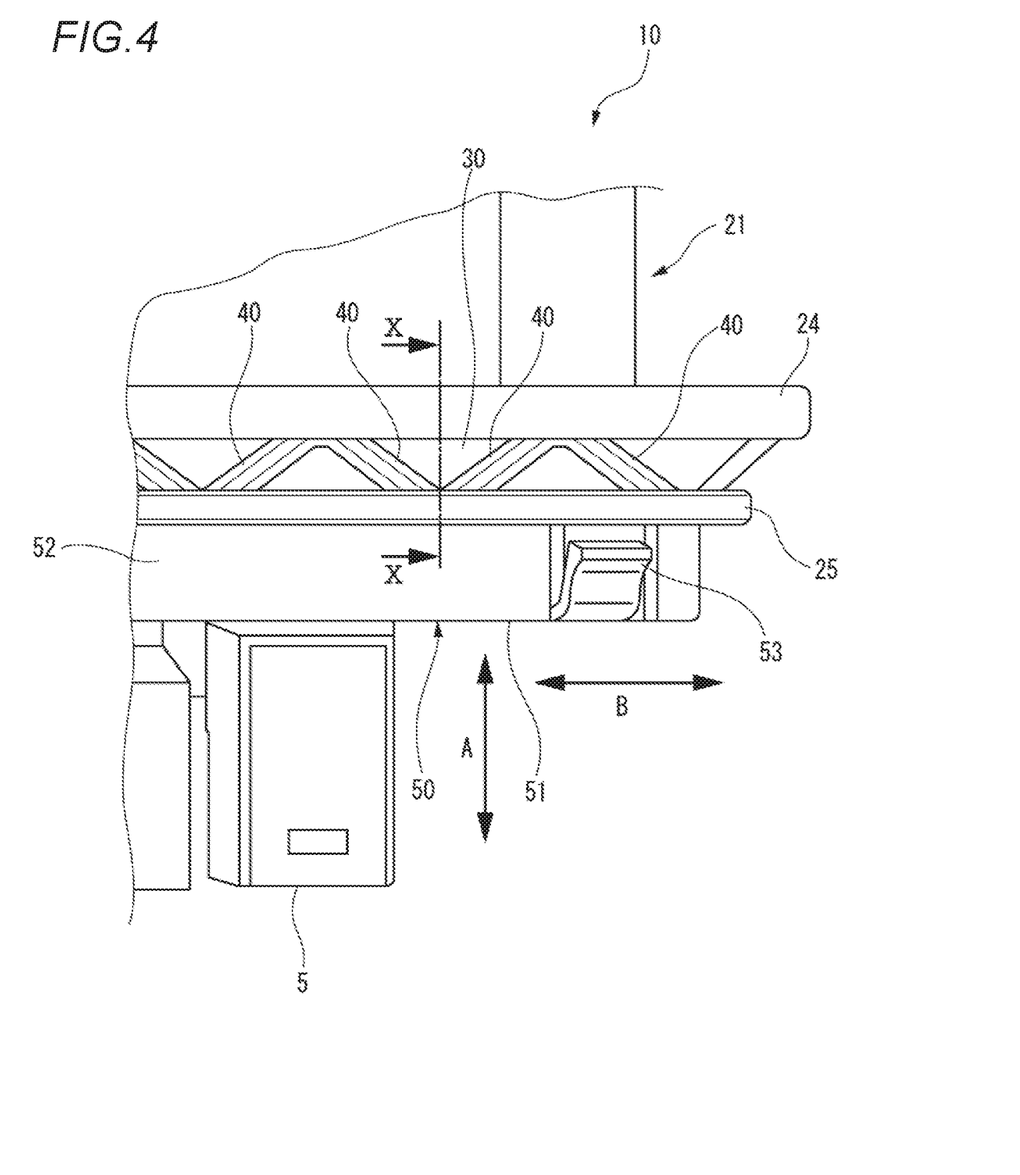
FIG. 4 is a side view illustrating a part of the panel mounting portion.
Figure 5:
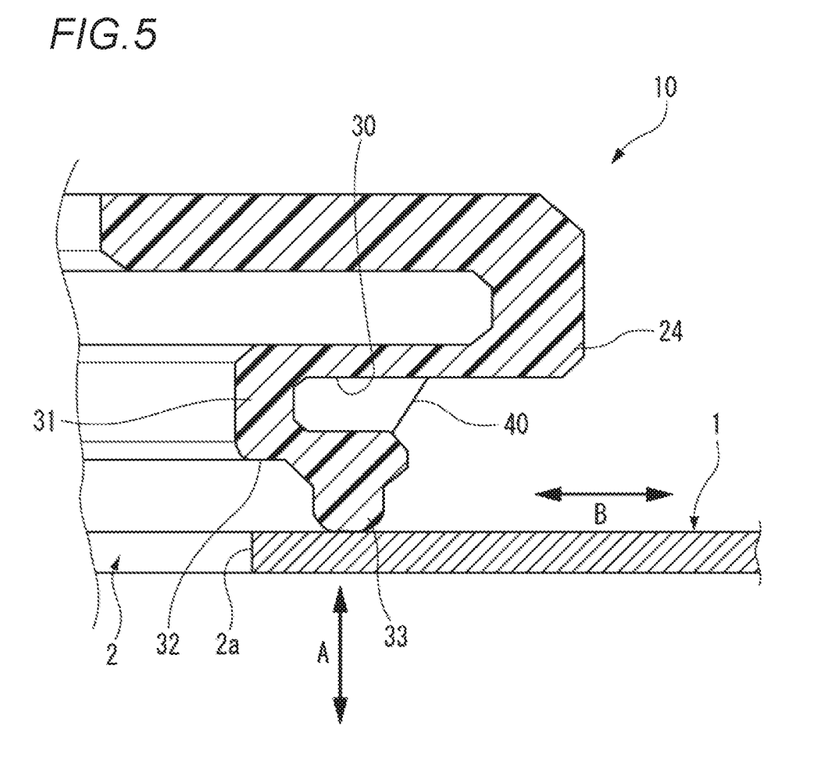
FIG. 5 is a cross-sectional view taken along a line X-X in FIG. 4.
Figure 6A:
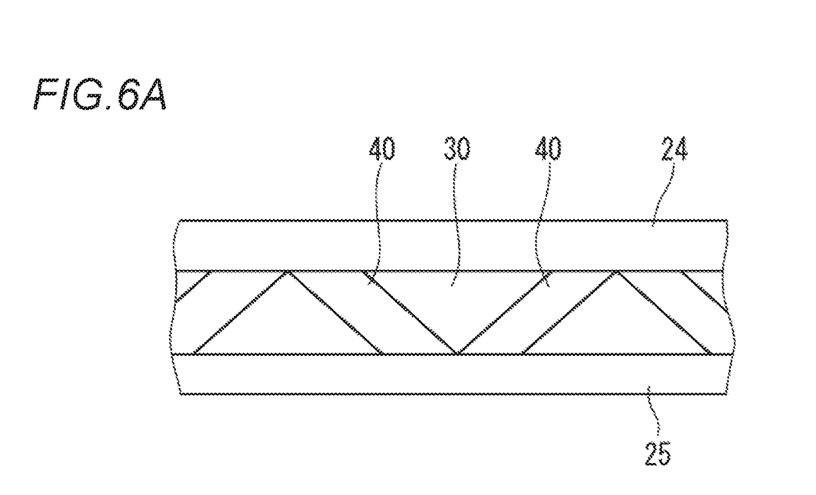
FIG. 6A is a schematic diagram of the seal portion before being mounted to the panel.
Figure 6B:
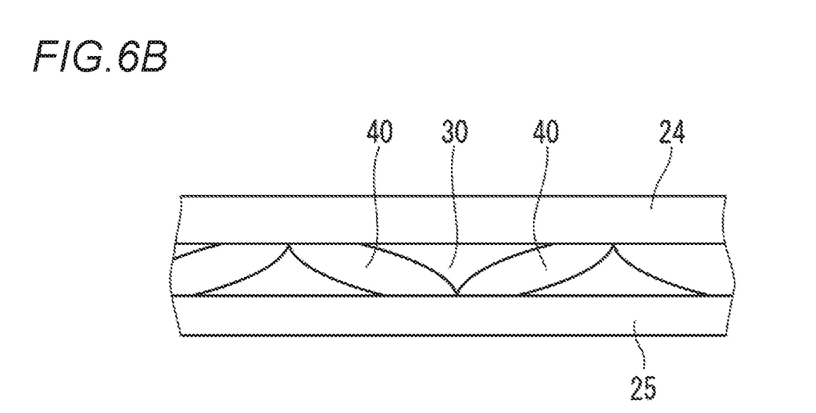
FIG. 6B is a schematic diagram of the seal portion when being mounted to the panel.

FIG. 4 is a cross-sectional view illustrating the seal portion of the panel mounting portion taken along the mounting direction. FIG. 5 is a cross-sectional view taken along a line X-X in FIG. 4. FIGS. 6A and 6B are diagrams illustrating reinforcing ribs in the seal portion. FIG. 6A is a schematic diagram of the seal portion before being mounted to the panel, and FIG. 6B is a schematic diagram of the seal portion when being mounted to the panel.

As illustrated in FIG. 4 and FIG. 5, the seal portion 25 formed on the panel mounting portion 21 is formed on the mounting side of the base portion 24 with respect to the panel 1. A groove portion 30 along a peripheral direction is formed between the base portion 24 and the seal portion 25.

The seal portion 25 includes a support portion 31, an extension portion 32 and a lip portion 33. The support portion 31 extends forward in the mounting direction A to the panel 1 from the base portion 24. The extension portion 32 extends outward in a radial direction B perpendicular to the mounting direction A from the support portion 31. The lip portion 33 protrudes forward in the mounting direction A from the extension portion 32.

A plurality of reinforcing ribs 40 are formed in the groove portion 30 formed in the panel mounting portion 21. The reinforcing ribs 40 are arranged in the peripheral direction and inclined with respect to the mounting direction A. The peripherally adjacent reinforcing ribs 40 are inclined in opposite directions from each other, and end portions of the reinforcing ribs 40 are continuously connected to each other so as to be arranged in a truss shape, for example, the peripherally adjacent reinforcing ribs 40 are inclined so as to be extended away from each other. Thus, in the groove portion 30, the plurality of reinforcing ribs 40 are provided so as to be continuous in the peripheral direction.

Next, a case where the grommet 10 described above is attached to the panel 1 will be described.

In order to mount the grommet 10 to the panel 1, the panel mounting portion 21 of the grommet 10 is brought close to the panel 1, and the fitting portion 51 of the inner member 50 is inserted into the attachment hole 2. Then, the lip portion 33 of the seal portion 25 of the panel mounting portion 21 is abutted on a surface of the panel 1.

Further, when the panel mounting portion 21 is pushed into the panel 1 side, the locking claws 53 of the fitting portion 51 of the inner member 50 lock the edge portion 2a of the attachment hole 2 of the panel 1. Accordingly, the panel mounting portion 21 of the grommet 10 is mounted to the panel 1. Further, the seal portion 25 is elastically deformed, and the lip portion 33 is pressed against the panel 1 and in close contact with the panel 1 with a large surface pressure. Accordingly, a mounting portion of the grommet 10 with respect to the panel 1 is sealed by the seal portion 25.

At this time, as illustrated in FIG. 6A, the peripherally adjacent reinforcing ribs 40 which are inclined in opposite directions, and whose end portions are continuously connected to each other so as to be arranged in a truss shape, are elastically deformed as a whole, as illustrated in FIG. 6B, such that portions in a vicinity of both ends are bent and crushed by a pressing force of the panel mounting portion 21 against the panel 1. Accordingly, a repulsive force from the elastically deformed reinforcing ribs 40 are dispersed in the peripheral direction and acts on the seal portion 25.

As a result, according to the grommet 10 of the present embodiment, since the reinforcing ribs 40 of connecting the base portion 24 and the seal portion 25 are arranged in the peripheral direction in the groove portion 30, the seal portion 25 can be reinforced by the reinforcing ribs 40, and a surface pressure with the panel 1 can be increased to obtain a good sealing property. Since the seal portion 25 is reinforced by the reinforcing ribs 40, deformation or damage of the seal portion 25 can be decreased even when the seal portion 25 makes contact with peripheral parts or the like during transportation or assembling.

Here, the grommet 10A according to a reference example will be described.

Figure 7:
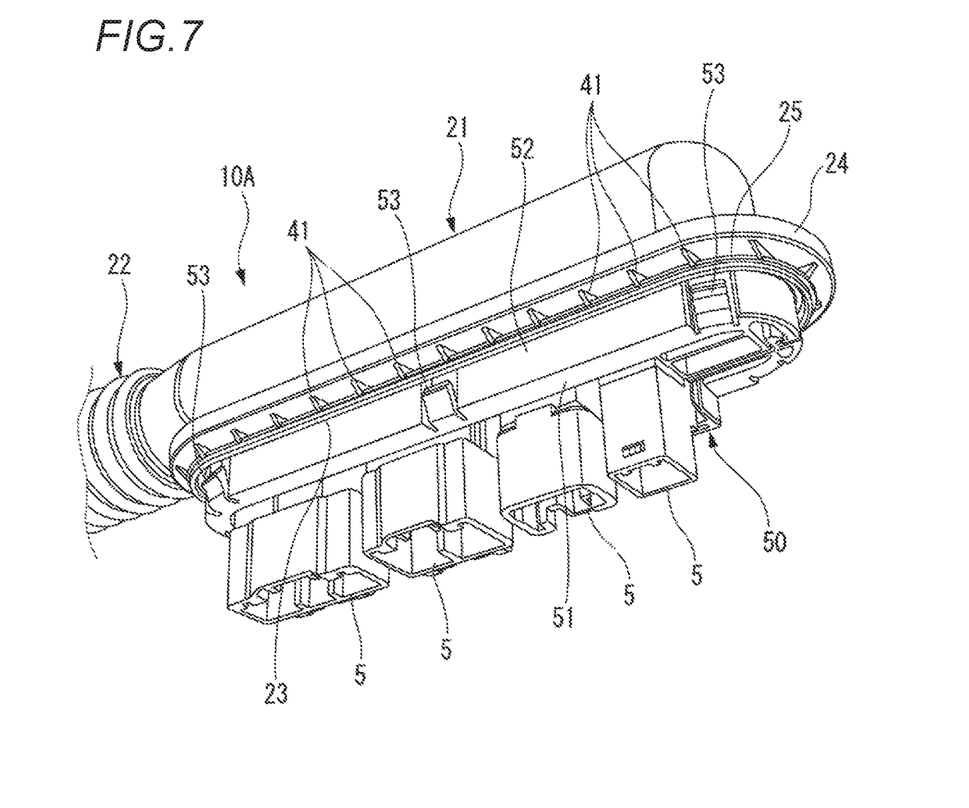
FIG. 7 is a perspective view of a panel mounting portion of a grommet according to a reference example.
Figure 8A:
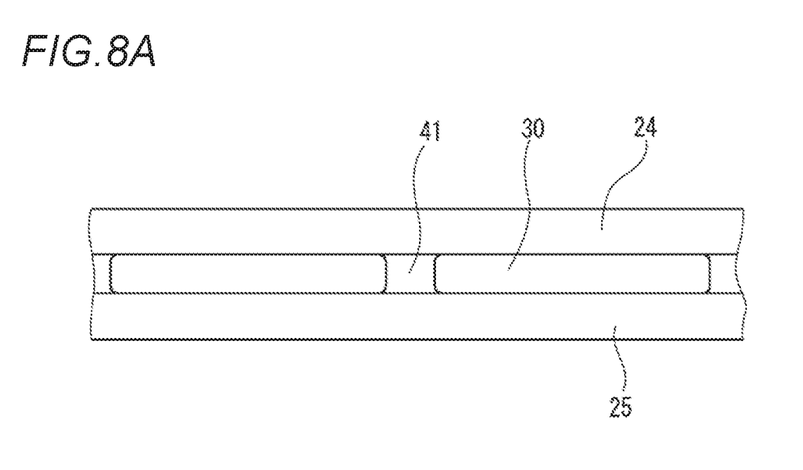
FIG. 8A is a schematic diagram of the seal portion before being mounted to the panel.
Figure 8B:
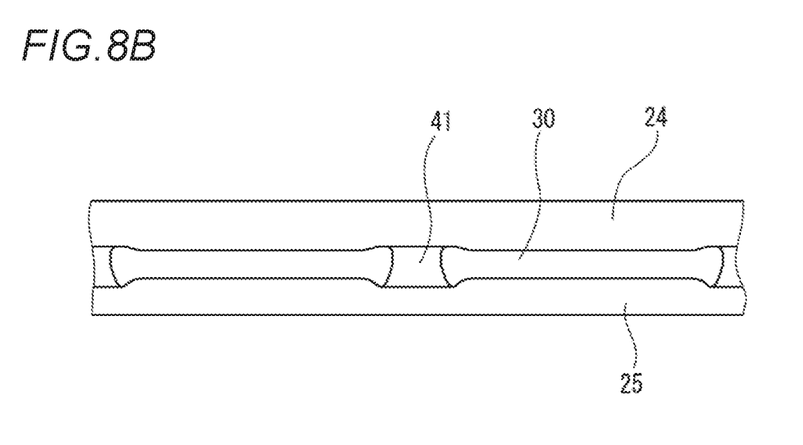
FIG. 8B is a schematic diagram of the seal portion when being mounted to the panel.

FIG. 7 is a perspective view of a panel mounting portion of a grommet according to the reference example. FIGS. 8A and 8B are diagrams illustrating reinforcing ribs in the seal portion according to the reference example. FIG. 8A is a schematic diagram of the seal portion before being mounted to the panel, and FIG. 8B is a schematic diagram of the seal portion when being mounted to the panel.

As illustrated in FIG. 7, in a grommet 10A according to the reference example, a plurality of reinforcing ribs 41 along the mounting direction A are formed between the base portion 24 and the seal portion 25 of the panel mounting portion 21 at intervals in the peripheral direction. According to the grommet 10A, the seal portion 25 is reinforced by the reinforcing ribs 41.

However, in the grommet 10A according to the reference example, as illustrated in FIG. 8A, in the groove portion 30, the longitudinal reinforcing ribs 41 along the mounting direction A receives a pressing force of the panel mounting portion 21 against the panel 1 in the longitudinal direction without much elastic deformation as illustrated in FIG. 8B. Thus, the seal portion 25 is locally reinforced at formation positions of the reinforcing ribs 41, and therefore, a large force is required to mount the panel mounting portion 21 to the panel 1, and the mounting operability is reduced. The seal portion 25 continues to locally receive a large surface pressure in a state where the seal portion 25 is in close contact with the panel 1 by the reinforcing ribs 41 for a long time, and thus compression set may occur and the sealing property may be decreased.

In contrast, according to the grommet 10 of the present embodiment, the reinforcing ribs 40 are inclined with respect to the mounting direction A of the panel mounting portion 21 to the panel 1. Therefore, reinforcement of the seal portion 25 by the reinforcing ribs 40 can be dispersed in the peripheral direction and reinforced in a well-balanced manner. Accordingly, compared with the case where the seal portion 25 is locally reinforced in the peripheral direction, the operability in mounting to the panel 1 can be improved. Moreover, since the seal portion 25 is in close contact with the panel 1 in the peripheral direction in a well-balanced manner, the compression set due to locally receiving the large surface pressure in the state where seal portion 25 is in close contact with the panel 1 for the long time can be decreased, and the good sealing property can be maintained for a long term.

In particular, since peripherally adjacent reinforcing ribs 40 are inclined in opposite directions, and the end portions of adjacent reinforcing ribs 40 are continuously connected to each other so as to be arranged in a truss shape, the seal portion 25 can be efficiently reinforced in the peripheral direction in a balanced manner.

Moreover, since the reinforcing ribs 40 are continuous in the peripheral direction of the panel mounting portion 21, the seal portion 25 can be reinforced by the reinforcing ribs 40 without deviation of the surface pressure in the peripheral direction.

The present invention is not limited to the above embodiment and may be appropriately modified, improved, or the like. In addition, the material, shape, size, number, arrangement position and the like of each component in the above-described embodiment are selectable and are not limited as long as the invention can be achieved.

Figure 9:
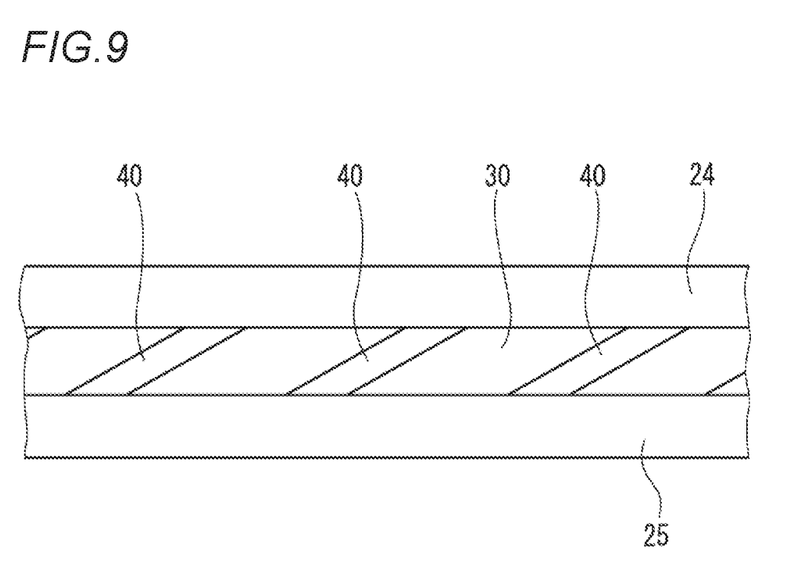
FIG. 9 is a schematic diagram of a seal portion for illustrating reinforcing ribs of different shapes.

For example, as illustrated in FIG. 9, the reinforcing ribs 40 may be inclined in the same direction with respect to the mounting direction A. In this case, the reinforcement of the seal portion 25 by the reinforcing ribs 40 can also be dispersed in the peripheral direction and the reinforcement can be performed in a well-balanced manner, and the seal portion 25 can be in close contact with the panel 1 in the peripheral direction in a well-balanced manner.

Figure 10:
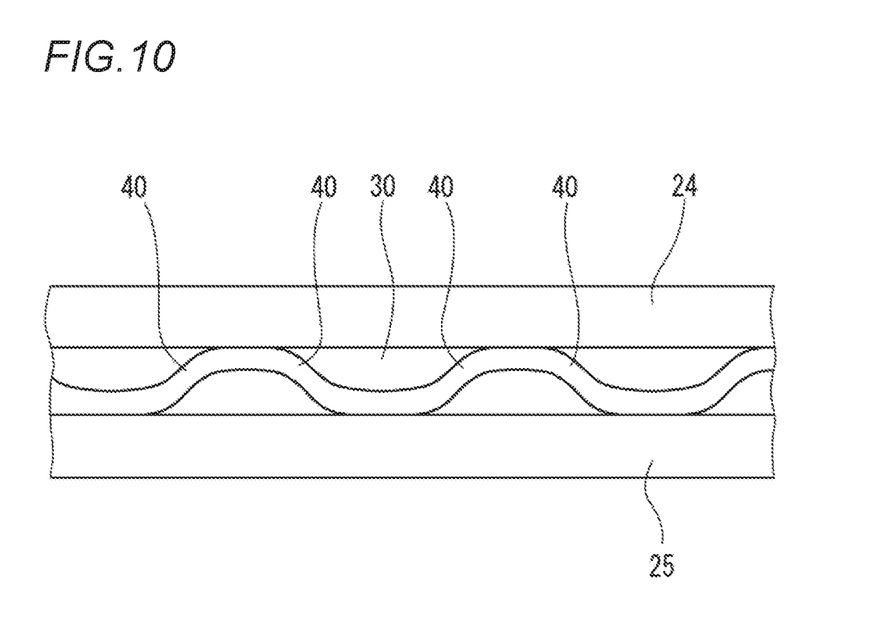
FIG. 10 is a schematic diagram of a seal portion for illustrating reinforcing ribs of different shapes.

As illustrated in FIG. 10, the reinforcing ribs 40 may be inclined in opposite directions, the end portions thereof may be connected to one another. Further, the reinforcing ribs 40 may be alternately curved in the peripheral direction. The seal portion 25 can be reinforced in the peripheral direction in a more balanced manner as long as such reinforcing ribs 40 are provided.

According to an aspect of the present invention, there is provided a grommet which is configured to cover a periphery of a wire harness, the grommet including a panel mounting portion which is configured to be mounted to a panel, in which the panel mounting portion includes, a base portion which is formed in an annular shape, a seal portion which is formed on the base portion and is configured to be in close contact with a surface of the panel, and a groove portion which is formed between the base portion and the seal portion along a peripheral direction of the panel mounting portion, in which a plurality of reinforcing ribs are configured to connect the base portion and the seal portion and are arranged in the peripheral direction in the groove portion, and in which the reinforcing ribs are inclined with respect to a mounting direction of the panel mounting portion to the panel.

According to an aspect of the present invention, the adjacent reinforcing ribs in the peripheral direction are inclined in opposite directions, and each of end portions of the adjacent reinforcing ribs are continuously connected to each other.

According to an aspect of the present invention, the reinforcing ribs are alternately curved in the peripheral direction.

According to another aspect of the present invention, the reinforcing ribs is provided to be continuous in the peripheral direction of the panel mounting portion.

According to the aspects of the present invention, since the reinforcing ribs of connecting the base portion and the seal portion are arranged in the peripheral direction in the groove portion, the seal portion can be reinforced by the reinforcing ribs, and the surface pressure with the panel can be increased to obtain a good sealing property. Since the seal portion is reinforced by the reinforcing ribs, deformation or damage of the seal portion can be decreased even when the seal portion makes contact with peripheral parts or the like during transportation or assembling.

Further, in the grommet of the aspects of the present invention, the reinforcing ribs are inclined with respect to the mounting direction of the panel mounting portion to the panel. Therefore, reinforcement of the seal portion by the reinforcing ribs can be dispersed in the peripheral direction and the reinforcement can be performed in a well-balanced manner. Accordingly, compared with a case where the seal portion is locally reinforced in the peripheral direction, the operability in mounting to the panel can be improved. Moreover, since the seal portion is in close contact with the panel in the peripheral direction in a well-balanced manner, the compression set due to locally receiving the large surface pressure in a state where the seal portion is in close contact with the panel for a long time can be decreased, and the good sealing property can be maintained for a long term.

According to the grommet of the aspects of the present invention, since peripherally adjacent reinforcing ribs are inclined in opposite directions, and the end portions of adjacent reinforcing ribs are continuously connected to each other so as to be arranged in a truss shape, the seal portion can be efficiently reinforced in the peripheral direction in a balanced manner.

According to the grommet of the aspects of the present invention, the reinforcing ribs are inclined in opposite directions, the end portions thereof are continuously connected to each other, and further the reinforcing ribs are alternately curved in the peripheral direction, so that the seal portion can be reinforced in a more balanced manner in the peripheral direction.

According to the grommet of the aspects of the present invention, the reinforcing ribs are provided to be continuous in the peripheral direction of the panel mounting portion. Therefore, the seal portion can be reinforced by the reinforcing ribs without deviation of the surface pressure in the peripheral direction.

REFERENCE SIGNS LIST 1 panel
10 grommet
21 panel mounting portion
24 base portion
25 seal portion
30 groove portion
40 reinforcing rib
A mounting direction

What is claimed is:
1. A grommet which is configured to cover a periphery of a wire harness, the grommet comprising:
   a panel mounting portion which is configured to be mounted to a panel,
   wherein the panel mounting portion includes:
      a base portion which is formed in an annular shape;
      a seal portion which is formed on the base portion and is configured to be in close contact with a surface of the panel; and
      a groove portion which is formed between the base portion and the seal portion along a peripheral direction of the panel mounting portion,
   wherein a plurality of reinforcing ribs are configured to connect the base portion and the seal portion and are arranged in the peripheral direction in the groove portion,
   wherein the reinforcing ribs are inclined with respect to a mounting direction of the panel mounting portion to the panel,
   wherein the adjacent reinforcing ribs in the peripheral direction are inclined in opposite directions,
   wherein each of end portions of the adjacent reinforcing ribs are continuously connected to each other, and wherein the reinforcing ribs are provided to be continuous in the peripheral direction of the panel mounting portion, over the entire length of the peripheral direction.

2. The grommet according to claim 1, wherein each of the reinforcing ribs abuts a pair of the reinforcing ribs.

3. A grommet which is configured to cover a periphery of a wire harness, the grommet comprising:
   a panel mounting portion which is configured to be mounted to a panel,
   wherein the panel mounting portion includes:
      a base portion which is formed in an annular shape;
      a seal portion which is formed on the base portion and is configured to be in close contact with a surface of the panel; and
      a groove portion which is formed between the base portion and the seal portion along a peripheral direction of the panel mounting portion,
   wherein a plurality of reinforcing ribs are configured to connect the base portion and the seal portion and are arranged in the peripheral direction in the groove portion,
   wherein the reinforcing ribs are inclined with respect to a mounting direction of the panel mounting portion to the panel,
   wherein the adjacent reinforcing ribs in the peripheral direction are inclined in opposite directions,
   wherein each of end portions of the adjacent reinforcing ribs are continuously connected to each other, and
   wherein the reinforcing ribs are alternately curved in the peripheral direction.

* * * * *